United States Patent
Seiler et al.

(10) Patent No.: US 10,935,998 B2
(45) Date of Patent: Mar. 2, 2021

(54) ECONOMIZER TEMPERATURE EXTRAPOLATION SYSTEMS AND METHODS

(71) Applicant: Johnson Controls Technology Company, Auburn Hills, MI (US)

(72) Inventors: Aron M. Seiler, White Hall, MD (US); Chandra S. Yelamanchili, York, PA (US); Nathan T. Ostrye, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 38 days.

(21) Appl. No.: 15/971,725

(22) Filed: May 4, 2018

(65) Prior Publication Data

US 2019/0250654 A1 Aug. 15, 2019

Related U.S. Application Data

(60) Provisional application No. 62/630,669, filed on Feb. 14, 2018.

(51) Int. Cl.

| G06F 1/20 | (2006.01) |
| G05D 23/19 | (2006.01) |
| G05D 23/20 | (2006.01) |
| F24F 11/38 | (2018.01) |
| F24F 11/46 | (2018.01) |
| G06F 1/16 | (2006.01) |
| F24F 110/12 | (2018.01) |

(52) U.S. Cl.
CPC .......... *G05D 23/1931* (2013.01); *F24F 11/38* (2018.01); *F24F 11/46* (2018.01); *G05D 23/1919* (2013.01); *G05D 23/20* (2013.01); *G06F 1/1692* (2013.01); *G06F 1/206* (2013.01); *F24D 2220/042* (2013.01); *F24F 2110/12* (2018.01)

(58) Field of Classification Search
CPC ........................................................ G06F 1/206
USPC ........................................................ 700/300
See application file for complete search history.

(56) References Cited

U.S. PATENT DOCUMENTS

| 5,276,630 | A | 1/1994 | Baldwin et al. |
| 5,801,940 | A | 9/1998 | Russ et al. |
| 7,104,460 | B2 | 9/2006 | Masen et al. |
| 7,434,413 | B2 * | 10/2008 | Wruck ............................ 62/126 |
| 8,181,472 | B2 | 5/2012 | Schenk et al. |
| 8,195,335 | B2 | 6/2012 | Kreft et al. |

(Continued)

FOREIGN PATENT DOCUMENTS

| KR | 100643264 B1 | 11/2006 |
| KR | 100749175 B1 | 8/2007 |

*Primary Examiner* — Suresh Suryawanshi
(74) *Attorney, Agent, or Firm* — Fletcher Yoder, P.C.

(57) ABSTRACT

A heating, ventilation, and air conditioning system includes a plurality of sensors including a first sensor configured to measure an outside air temperature of outside air, a second sensor configured to measure a return air temperature of return air, and a third sensor configured to measure a mixed air temperature of mixed air. The system also includes a controller communicatively coupled to the plurality of sensors. The controller is configured to determine that data from one of the plurality of sensors is unavailable and estimate the data from the one of the plurality of sensors based on data from other sensors of the plurality of sensors.

19 Claims, 6 Drawing Sheets

(56) References Cited

U.S. PATENT DOCUMENTS

| | | | |
|---|---|---|---|
| 8,918,218 B2 | 12/2014 | Grabinger et al. | |
| 8,965,586 B2 | 2/2015 | Miller et al. | |
| 9,255,720 B2 | 2/2016 | Thomle et al. | |
| 9,500,382 B2 | 11/2016 | Grabinger et al. | |
| 9,765,986 B2 | 9/2017 | Thomle et al. | |
| 2011/0172831 A1* | 7/2011 | Kreft | F24F 3/044 700/278 |
| 2011/0264275 A1* | 10/2011 | Thomle | F24F 11/30 700/276 |
| 2011/0264280 A1* | 10/2011 | Grabinger | F24F 11/0008 700/282 |
| 2012/0079425 A1* | 3/2012 | Grabinger | F24F 11/30 715/810 |
| 2013/0282186 A1 | 10/2013 | Douglas et al. | |
| 2013/0324027 A1 | 12/2013 | Davis | |
| 2014/0207288 A1* | 7/2014 | Albrecht | F24F 11/0001 700/276 |
| 2014/0216705 A1* | 8/2014 | Dage | B60H 1/00878 165/202 |
| 2015/0362537 A1* | 12/2015 | Van Gorp | H02J 3/00 702/60 |
| 2016/0123615 A1* | 5/2016 | Mikulica | F24F 11/0001 165/250 |
| 2016/0348936 A1* | 12/2016 | Johnson, Jr. | F24F 11/30 |
| 2017/0016642 A1* | 1/2017 | Spalink | F24F 11/30 |
| 2017/0268797 A1 | 9/2017 | Mowris et al. | |
| 2017/0356669 A1* | 12/2017 | Gonia | F24D 19/1084 |
| 2019/0250654 A1* | 8/2019 | Seiler | G05D 23/1931 |

\* cited by examiner

ECONOMIZER TEMPERATURE EXTRAPOLATION SYSTEMS AND METHODS

CROSS REFERENCE TO RELATED APPLICATION

This application is a Non-Provisional Application claiming priority to U.S. Provisional Application No. 62/630,669 entitled "ECONOMIZER TEMPERATURE EXTRAPOLATION SYSTEMS AND METHODS," filed Feb. 14, 2018, which is hereby incorporated by reference in its entirety for all purposes.

BACKGROUND

The present disclosure relates generally to heating, ventilation, and air conditioning (HVAC) systems, and, more particularly, to air economizers of the HVAC system.

A wide range of applications exist for HVAC systems. For example, residential, light commercial, commercial, and industrial systems are used to control temperatures and air quality in residences and buildings. Generally, HVAC systems may circulate a fluid, such as a refrigerant, through a closed loop between an evaporator coil where the fluid absorbs heat and a condenser where the fluid releases heat. The fluid flowing within the closed loop is generally formulated to undergo phase changes within the normal operating temperatures and pressures of the system so that quantities of heat can be exchanged by virtue of the latent heat of vaporization of the fluid. A fan may blow air over, or pull air across, the coils of the heat exchanger(s) in order to condition the air. The volume of air passing over the coils of the heat exchanger may include a portion of air returned from a conditioned space of the residence or building, referred to as "return air" or "indoor air", and a portion of external or ambient air, referred to as "outside air," which may be used to ventilate the return air.

A traditional air economizer of a traditional HVAC system may receive the return air and outside air, combine the flows thereof, and pass the combined flow over a heat exchange coil. Traditional air economizers may operate based on data from a variety of sensors. In such instances, the traditional air economizers may discontinue operation if data from one of the sensors becomes unreliable. Accordingly, improved air economizers for HVAC systems are desired.

SUMMARY

The present disclosure relates to a heating, ventilation, and air conditioning system having a plurality of sensors including a first sensor configured to measure an outside air temperature of outside air, a second sensor configured to measure a return air temperature of return air, and a third sensor configured to measure a mixed air temperature of mixed air. The system also includes a controller communicatively coupled to the plurality of sensors, wherein the controller is configured to determine that data from one of the plurality of sensors is unavailable and estimate the data from the one of the plurality of sensors based on data from other sensors of the plurality of sensors.

The present disclosure also relates to air economizer of a heating, ventilation, and air conditioning (HVAC) system, including an outside air temperature sensor adapted to measure an outside air temperature of outside air during functional operation, a return air temperature sensor adapted to measure a return air temperature of return air during functional operation, and a mixed air temperature sensor adapted to measure a mixed air temperature of mixed air during functional operation. The air economizer further includes a controller communicatively coupled to the outside air temperature sensor, the return air temperature sensor, and the mixed air temperature sensor, wherein the controller is configured to determine that a single one of the outside air temperature sensor, the return air temperature sensor, and the mixed air temperature sensor is a functionally unavailable sensor while a remaining two sensors of the outside air temperature sensor, the return air temperature sensor, and the mixed air temperature sensor are functional and estimate a respective measurement of the functionally unavailable sensor based on data provided by the remaining two sensors.

The present disclosure further relates to and air economizer of a heating, ventilation, and air conditioning (HVAC) system configured to intake outside air from a surrounding environment, mix the outside air with return air from a building to form mixed air, and supply the mixed air to the building. The air economizer includes an outside air temperature sensor configured to measure an outside air temperature of the outside air, a return air temperature sensor configured to measure a return air temperature of the return air, a mixed air temperature sensor configured to measure a mixed air temperature of the mixed air, and a controller communicatively coupled to the outside air temperature sensor, the return air temperature sensor, and the mixed air temperature sensor, wherein the controller is configured to determine that the mixed air temperature sensor is unavailable and estimate the mixed air temperature based on the return air temperature and the outside air temperature.

DETAILED DESCRIPTION

The present disclosure is directed toward a commercial, industrial, or residential heating, ventilation, and air conditioning system ("HVAC system"). More particularly, the present disclosure is directed toward a system and method for determining one or more operating parameters of an air economizer of the HVAC system.

For example, an HVAC system may include an air economizer having an indoor or return air intake section or compartment configured to receive indoor air from a space conditioned by the HVAC system and an outdoor air intake section configured to receive outdoor air from an ambient environment. The outdoor air may be combined with the indoor air to generate a ventilated and/or cooled combined volume of air. The combined volume of air may pass over a coil of a heat exchanger, such as an evaporator coil, and a refrigerant or other fluid passing through the evaporator coil may absorb heat from the combined volume of air, thereby further cooling the combined volume of air.

The air economizer may include sensors for determining various operational inputs. More specifically, the air economizer may include respective temperature sensors for determining each of a return air temperature, an outside or ambient air temperature, and a mixed air temperature. The air economizer may operate based at least partially on temperature data gathered by the respective temperature sensors. However, in certain embodiments, one or more of the respective temperature sensors may, on occasion, become unavailable. Accordingly, in such embodiments, the temperature data that would otherwise be obtained through the unavailable sensor may instead be extrapolated based on the other operational inputs, thereby enabling the economizer to continue operation and avoid downtime.

Figure 1:
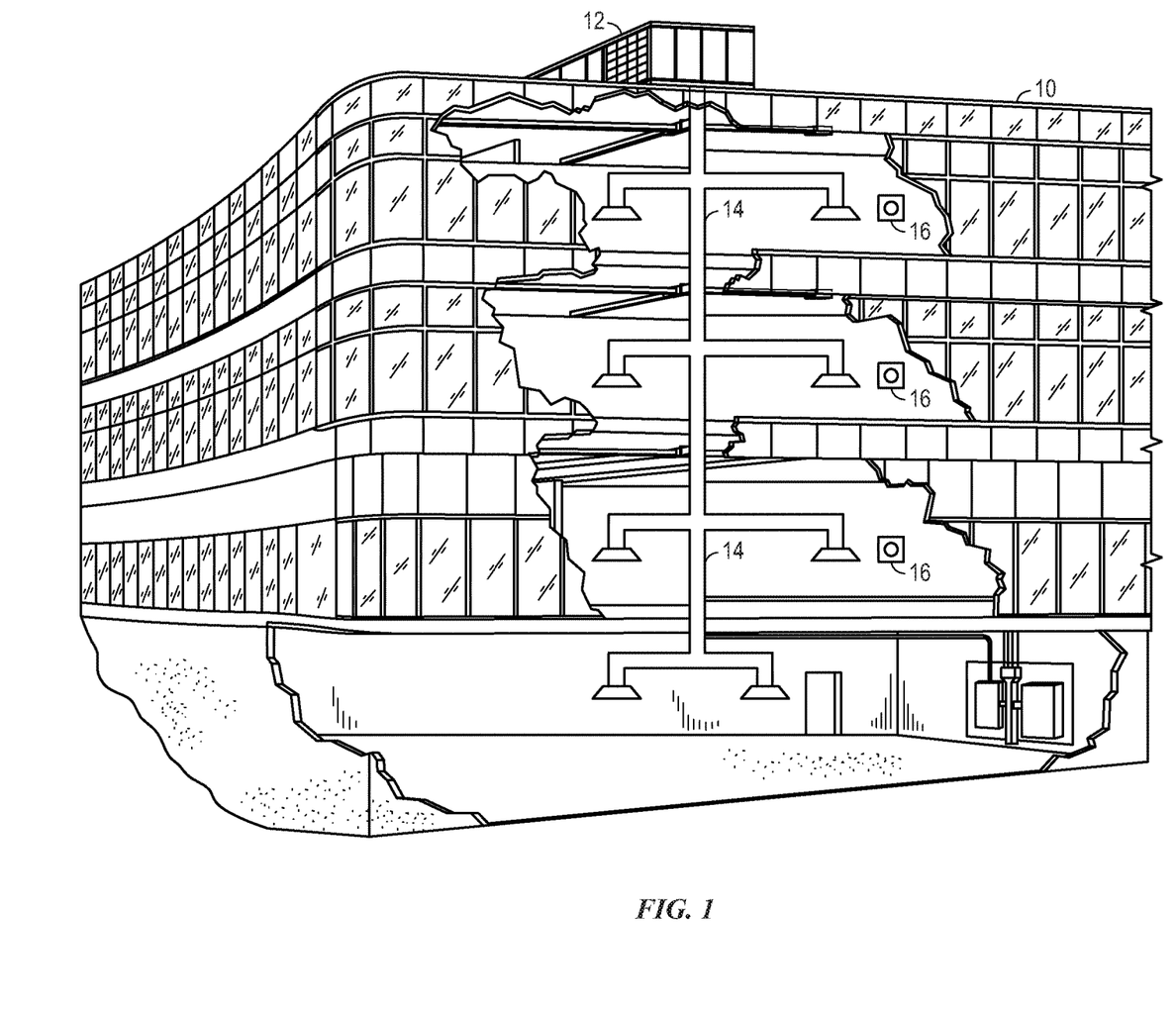
FIG. 1 is an illustration of an embodiment of a commercial or industrial HVAC system, in accordance with the present techniques.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
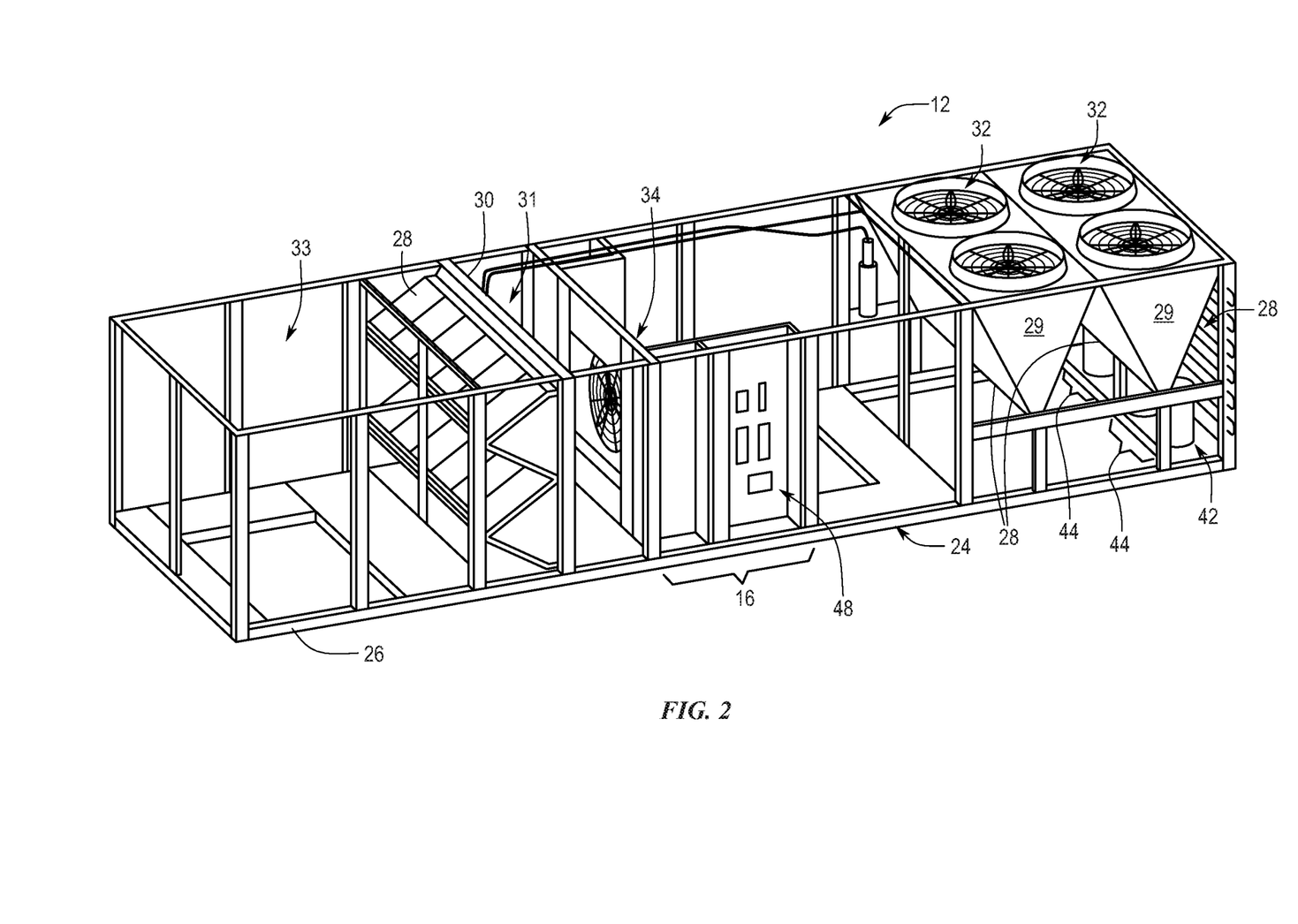
FIG. 2 is an illustration of an embodiment of a portion of a packaged unit of the HVAC system shown in FIG. 1, in accordance with the present techniques.

FIG. 2 is a perspective view of an embodiment of a portion of the HVAC unit 12. For example, the portion of the HVAC unit 12 illustrated in FIG. 2 has certain features, such as panels, removed for clarity. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28, where the heat exchanger 28 may be framed within the cabinet 24 of the HVAC unit 12 and/or containers 29 below the fans 32. Air may be heated and/or cooled as the air flows through the heat exchanger 28 before being released back to the environment surrounding the rooftop unit 12. A blower assembly 34, powered by a motor hidden from view behind the blower assembly 34, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In some embodiments, an air economizer 35 may be disposed in an area 33 of the HVAC unit 12 upstream of the filters 38. Further, in certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. In the illustrated embodiment, the compressors 42 include two dual stage configurations 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, pressure switches, phase monitors, and humidity sensors, among other things.

The HVAC unit 12 may receive power through a terminal block, which is hidden from view behind the illustrated control board 48. For example, a high voltage power source may be connected to the terminal block to power the equipment. The operation of the HVAC unit 12 may be governed or regulated by the control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring may connect the control board 48 and the terminal block to the equipment of the HVAC unit 12.

Figure 3:
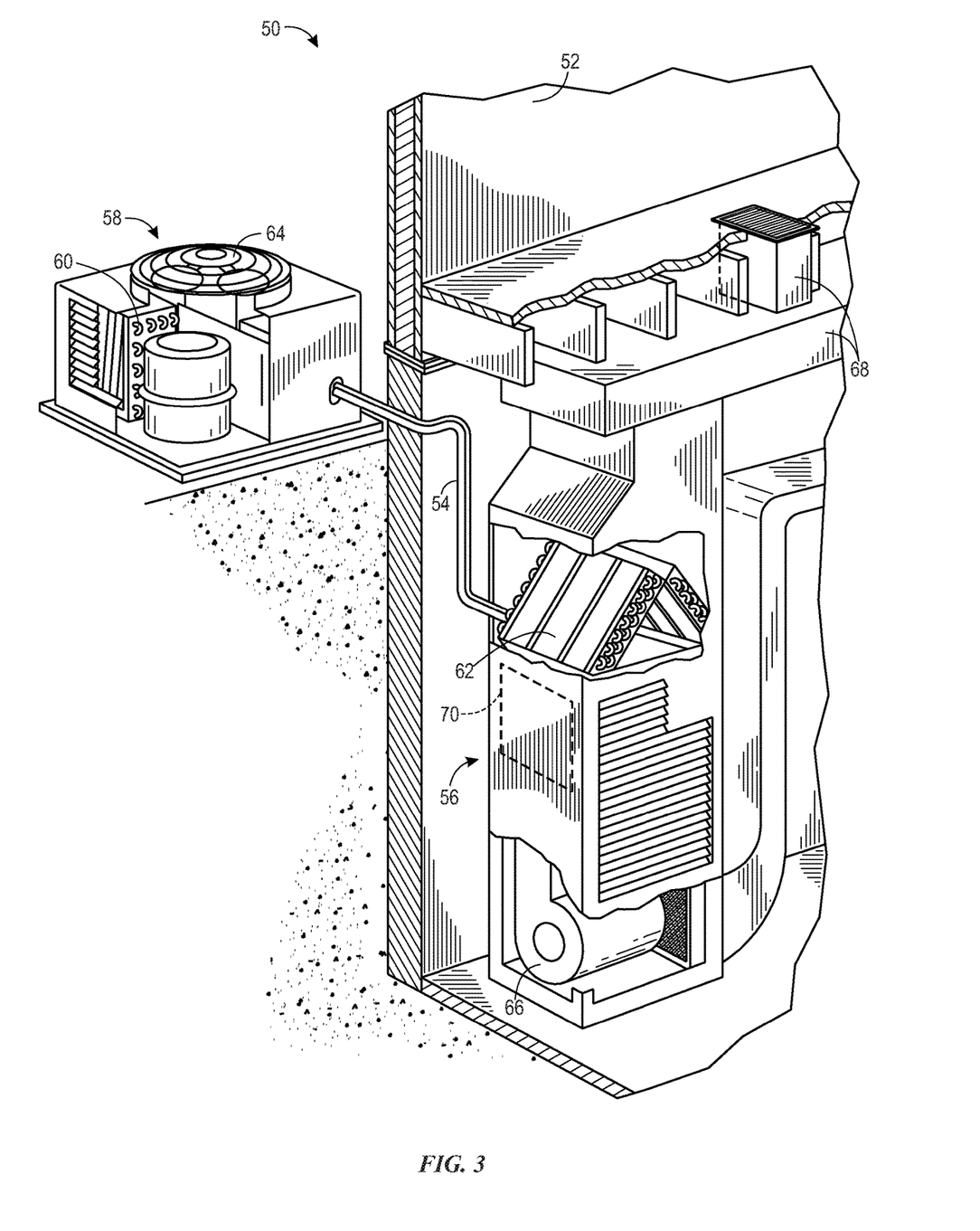
FIG. 3 is an illustration of an embodiment of a split system of the HVAC system shown in FIG. 1, in accordance with the present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
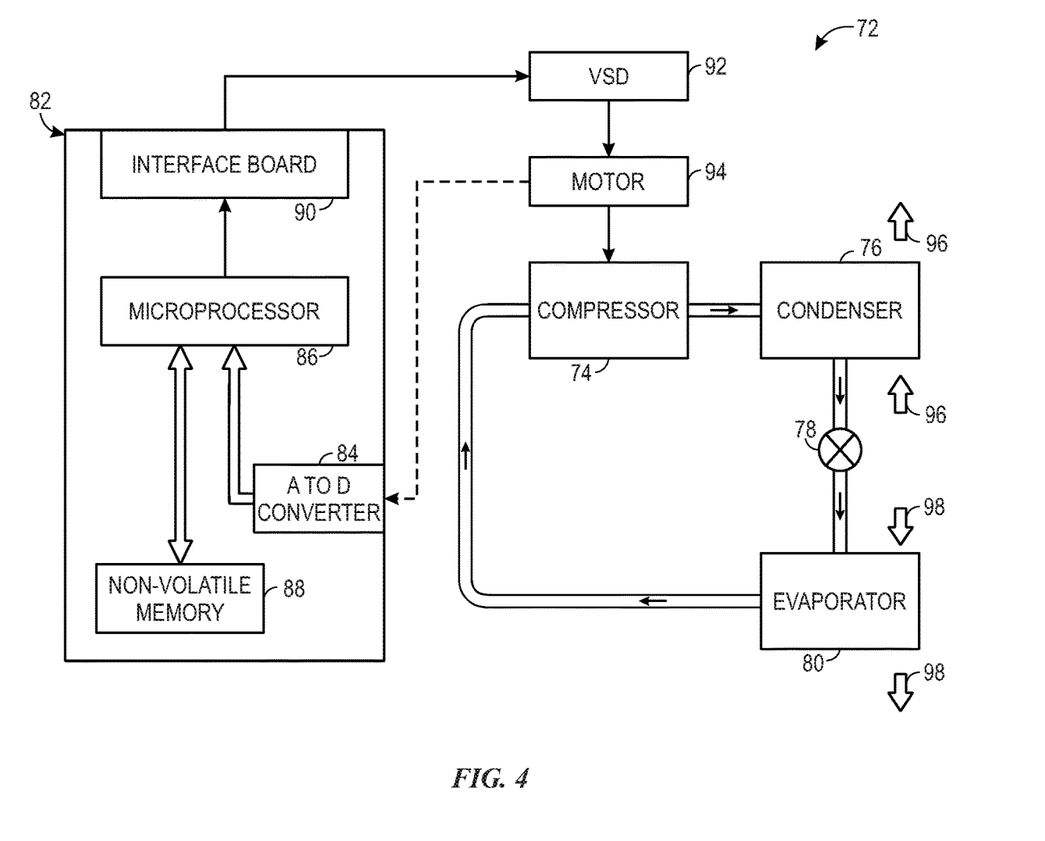
FIG. 4 is a schematic diagram of an embodiment of a refrigeration system of the HVAC system shown in FIG. 1, in accordance with the present techniques.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Further, in accordance with present techniques, systems and methods are used to determine temperature data of an unavailable sensor of the air economizer 35 of the HVAC unit 12, which may be incorporated into any one of the systems illustrated in FIGS. 1-4. For example, as mentioned above, the air economizer 35 and corresponding features described below may be disposed in the area 33 illustrated in FIG. 2. As will be appreciated, the systems discussed herein may include a variety of sensors that are configured to or adapted to obtain measurements of operating parameters associated with the sensors. However, one or more of the sensors, while being configured or adapted to obtain data, may occasionally be unavailable or unable to provide the expected data. As such, data from a sensor may be unavailable occasionally due to various circumstances. The techniques discussed herein enable the estimation of unavailable data. By extrapolating sensor data that is unavailable from certain sensors, operation of the air economizer may continue operation as normal when a sensor becomes unavailable. These and other features will be described in detail below.

Figure 5:
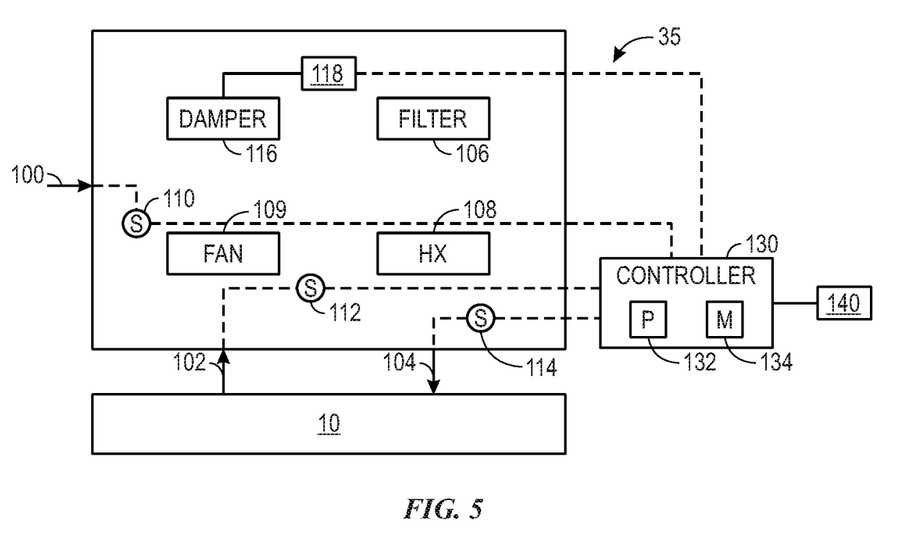
FIG. 5 is a schematic diagram of an embodiment of an air economizer for use in any of the HVAC systems of FIGS. 1-4, in accordance with the present techniques.

Referring now to FIG. 5, the air economizer 35 may generally be utilized to cool a building utilizing outside air 100 while saving energy. For example, in some instances, when the outside air temperature is sufficiently low, the air economizer 35 may utilize the outside air 100 to help cool the building 10. That is, when the outside air 100 temperature is at or below the set point temperature, the air economizer 35 may mix the outside air 100 with return air 102 from the building 10 to form mixed air 104, which is then supplied to the building 10. Overall, the HVAC unit 12 (FIGS. 1 and 2) may utilize the outside air 100 for cooling purposes in addition to or in the alternative to running the compressor 74 of the vapor compression system 72 (FIG. 4), thereby saving in energy costs. In certain embodiments, air economizer 35 may also include a filter 106, which is configured to remove particulates from air flowing through the air economizer 35. The air economizer 35 may also include one or more heat exchangers 108, which may be utilized to remove or add heat to the mixed air 104 before it is supplied to the building 10. In certain embodiments, the mixed air 104 may preheat or precool fluid within the heat exchanger 108 to be later used within the vapor compression system 72. The air economizer 35 may further include one or more fans 109, or blowers, which may be configured to intake the outside air 100, intake the return air 102, expel the mixed air 104, expel exhaust, or any combination thereof.

Operation of the air economizer 35 may be based on a number of inputs. For example, operation of the air economizer 35 may be based on the set point temperature of the building 10 relative to temperatures of the outside air 100, the return air 102, and the mixed air 104. To this end, an outside air sensor 110 may be utilized to measure a temperature of the outside air 100, a return air sensor 112 may utilized to measure a temperature of the return air 102, and a mixed air sensor 114 may be utilized to measure a temperature of the mixed air 104. Further, the air economizer 35 may utilize a damper 116 to control the flow of the outside air 100 and/or return air 102 through the economizer 35. Indeed, in certain embodiments, the damper 116 may include two separate dampers 116 configured to individually control the flow of the outside air 102 and the return air 104 through the economizer 35. The damper 116 may be controlled via an actuator 118 that is configured to measure and/or determine a position of the damper 116. The position of the damper 116 may be expressed as a percentage between a closed position and an open position. For example, a position of 80% may indicate that the damper 116 is 80% open, a position of 40% may indicate that the damper 16 is 40% open, and so forth.

The outside air sensor 110, the return air sensor 112, the mixed air sensor 114, and the actuator 118 may be communicatively coupled to a controller 130, such as a computer-based controller, which may have a processor 132, such as a micro-processor, a memory 134, and executable code stored thereon. The processor 132 may be any general purpose or application-specific processor. The memory 134 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by a processor, such as the processor 132, or by any general purpose or special purpose computer or other machine with a processor, such as the processor 132.

The controller 130 is configured to receive data from the outside air sensor 110, the return air sensor 112, and the mixed air sensor 114 that is indicative of temperatures of the outside air 100, the return air 102, and the mixed air 104, respectively. The controller 130 is also configured to receive data from the actuator 118 that is indicative of the position of the damper 116. In operation, the controller 130 may receive data indicative of the temperatures of the outside air 100, return air 102, and the mixed air 104 and compare the temperatures to the set point temperature, which may have been set by the control device 16. For example, if the HVAC unit 12 is in a cooling mode and the temperature of the outside air 100 is sufficiently low compared to the set point temperature, the controller 130 may send a signal to open the damper 116 to allow the cool outside air 100 to mix with the return air 102 from the building 10 in order to form the mixed air 104, which may be lower in temperature than the return air 102 to due to the cooler, outside air 100 component of the mixed air 104.

In certain instances, however, one or more of the outside air sensor 110, the return air sensor 112, and the mixed air sensor 114 may discontinue its reading of the temperatures, discontinue its supply of data to the controller 130, discontinue communication with the controller 130, or may otherwise be unavailable. Accordingly, as used herein, such a sensor, while configured or adapted to collect data, may be referred to as an unavailable sensor or may be referred to as having become unavailable.

If a sensor becomes unavailable, the controller 130 may activate an alarm 140. The alarm 140 may be any suitable means that informs an operator of the HVAC unit 12 that a sensor has become unavailable. For example, in some embodiments, the alarm 140 may be included in an operator interface, such as a display, touch screen, or other media. In some embodiments, the alarm 140 may be a physical alarm such as a physical siren, light source, or noise generator. Generally, the alarm 140 may be any suitable means that is configured to alert an operator or other person or entity that a sensor has become unavailable. Moreover, the alarm 140 may also indicate which sensor has become unavailable via an indicator, such as a text box, a schematic showing the location of the sensor, and/or any other suitable manner. Therefore, the operator may take to necessary steps to replace or repair the unavailable sensor when notified via the alarm 140 that a particular sensor has become unavailable.

When one of the outside air sensor 110, the return air sensor 112, or the mixed air sensor 114 becomes unavailable, the controller 130 may continue operation of the air economizer 35 based on extrapolated data. For example, the controller 130 may calculate, or extrapolate, the temperature of the respective air that would otherwise be measured by the unavailable sensor. For example, in some embodiments, if the outside air sensor 110 becomes unavailable, the controller 130 may determine the temperature of the outside air 100 using equation (1):

$$OAT = \frac{MAT - (RAT(1 - DP))}{DP} \quad (1)$$

where OAT is outside air temperature, MAT is mixed air temperature, RAT is return air temperature, and DP is damper position, which may be expressed as a percentage, as discussed above. As a further example, if the return air sensor 112 becomes unavailable, the controller 130 may determine the temperature of the return air 102 using equation (2):

$$RAT = \frac{MAT - (OAT)(DP)}{1 - DP} \quad (2)$$

where OAT is outside air temperature, MAT is mixed air temperature, RAT is return air temperature, and DP is damper position, which may be expressed as a percentage, as discussed above. As a further example, if the mixed air sensor 114 becomes unavailable, the controller 130 may determine the temperature of the mixed air 104 using equation (3):

$$MAT = (OAT)(DP) + (RAT)(1 - DP) \quad (3)$$

where OAT is outside air temperature, MAT is mixed air temperature, RAT is return air temperature, and DP is damper position, which may be expressed as a percentage, as discussed above.

Figure 6:
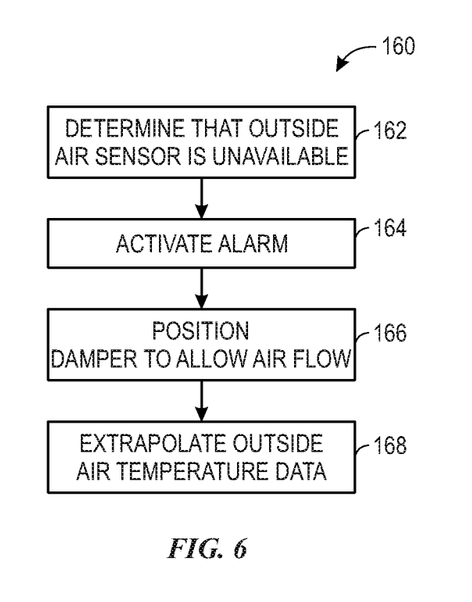
FIG. 6 is a flow diagram of extrapolating data of an unavailable sensor of the air economizer of FIG. 5, in accordance with the present techniques.

Keeping this in mind, FIG. 6 is flow diagram illustrating an outside air temperature determination method 160, which may be utilized by the controller 130 to determine the outside air temperature when the outside air sensor 110 becomes unavailable. At block 162, the outside air sensor 110 may be identified or flagged as an unavailable sensor. That is, the outside air sensor 110 may discontinue supplying data indicative of the outside air temperature to the controller 130, and the controller 130 may therefore determine that the outside air sensor 110 is unavailable. Once the outside air sensor 110 is flagged as unavailable, the controller 130 may also activate an alarm, as indicated by block 164, thereby alerting operators that the outside air sensor 110 is unavailable. The operators may then act accordingly, such as by replacing or repairing the outside air sensor 110. At block 166, the controller 130 may position the damper 116, such as via the actuator 118, to allow at least some air flow. Particularly, in certain embodiments, the damper 116 may be positioned to be 10% or more open. In some embodiments, elements of block 166 may occur substantially simultaneously or subsequently of the occurrence of the elements of blocks 162 and 164.

At block 168, the outside air temperature may be extrapolated, or calculated, based on the return air temperature, the mixed air temperature, and the damper position. Particularly, as mentioned above, the outside air temperature may be determined by utilizing equation (1). In this manner, the air economizer 35 may continue to operate based on measured data indicative of the return air temperature, the mixed air temperature, and the damper position, and on extrapolated data indicative of the outside air temperature.

Figure 7:
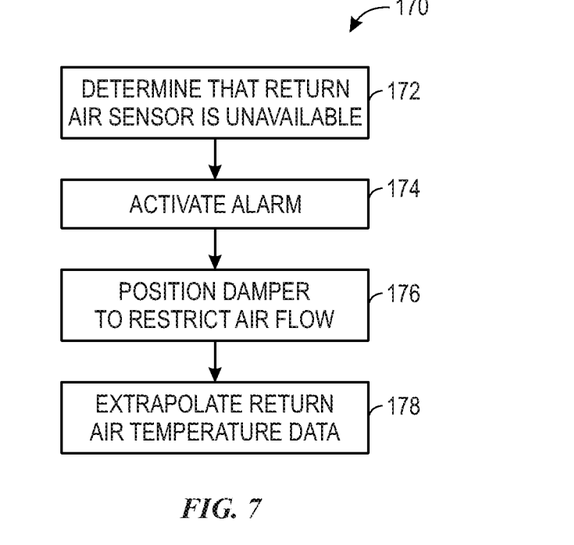
FIG. 7 is a flow diagram of extrapolating data of an unavailable sensor of the air economizer of FIG. 5, in accordance with the present techniques.

FIG. 7 is a flow diagram illustrating a return air temperature determination method 170, which may be utilized by the controller 130 to determine the return air temperature when the return air sensor 112 becomes unavailable. At block 172, the return air sensor 112 may be identified or flagged as an unavailable sensor. That is, the return air sensor 112 may discontinue a supply of data indicative of the return air temperature to the controller 130 and the controller 130 may determine that the return sensor 112 is unavailable. Once the return air sensor 112 is flagged as unavailable, the controller 130 may also activate an alarm, as indicated by block 174, thereby alerting operators that the return air sensor 112 is unavailable. The operators may then act accordingly, such as by replacing or repairing the return air sensor 112. At block 176, the controller 130 may position the damper 116, such as via the actuator 118, to restrict at least some air flow. In certain embodiments, the damper 116 may be positioned to be 90% or less open. In some embodiments, the elements of block 176 may occur substantially simultaneously or subsequently of the occurrence of the elements of blocks 172 and 174.

At block 178, the return air temperature may be extrapolated, or calculated, based on the outside air temperature, the mixed air temperature, and the damper position. Particularly, as mentioned above, the outside air temperature may be determined by utilizing equation (2). In this manner, the air economizer 35 may continue to operate based on measured data indicative of the outside air temperature, the mixed air temperature, and the damper position, and on extrapolated data indicative of the return air temperature.

Figure 8:
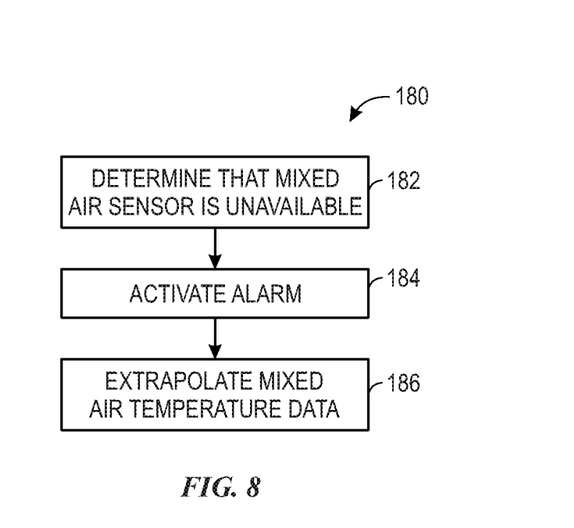
FIG. 8 is a flow diagram of extrapolating data of an unavailable sensor of the air economizer of FIG. 5, in accordance with the present techniques.

FIG. 8 is flow diagram illustrating a mixed air temperature determination method 180, which may be utilized by the controller 130 to determine the mixed air temperature when the mixed air sensor 114 becomes unavailable. Prior to institution of the method 180, the air economizer 35 may operate as normal. At block 182, the mixed air sensor 114 may be flagged as an unavailable sensor. That is, the mixed air sensor 114 may discontinue its supply of data indicative of the mixed air temperature to the controller 130 and the controller 130 may determine that the mixed air sensor 114 is unavailable. Once the mixed air sensor 114 is flagged as unavailable, the controller 130 may also activate an alarm, as indicated by block 184, thereby alerting operators that the mixed air sensor 114 is unavailable. The operators may then act accordingly, such as by replacing or repairing the mixed air sensor 114.

At block 186, the mixed air temperature may be extrapolated based on the return air temperature, the outside air temperature, and the damper position. Particularly, as mentioned above, the mixed air temperature may be determined by utilizing equation (3). In this manner, the air economizer 35 may continue to operate based on measured data indicative of the return air temperature, the outside air temperature, and the damper position, and on extrapolated data indicative of the mixed air temperature.

One or more of the disclosed embodiments, alone or in combination, may provide one or more technical effects useful in enhancing efficiency of a heat exchanger of an HVAC system. For example, in general, embodiments of the present disclosure include an air economizer that is configured to extrapolate data of an unavailable sensor. Therefore, the air economizer may continue to operate as normal based on the extrapolated data. In this manner, the air economizer may avoid downtime when a sensor becomes unavailable.

While only certain features and embodiments of the present disclosure have been illustrated and described, many modifications and changes may occur to those skilled in the art without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and air conditioning (HVAC) system, comprising:
a plurality of sensors, comprising: a first sensor configured to measure an outside air temperature of outside air, a second sensor configured to measure a return air temperature of return air, and a third sensor configured to measure a mixed air temperature of mixed air; and
a controller communicatively coupled to the plurality of sensors, wherein the controller is configured to determine that data from one of the plurality of sensors is unavailable and estimate the data from the one of the plurality of sensors based on data from other sensors of the plurality of sensors, wherein the data from the other sensors of the plurality of sensors comprises at least two of: the outside air temperature of outside air, the return air temperature of return air, and the mixed air temperature of mixed air.

2. The HVAC system of claim 1, comprising a damper configured to control air flow through an air economizer having the plurality of sensors, wherein the controller is communicatively coupled to the damper and configured to determine the data from the one of the plurality of sensors based on a position of the damper.

3. The HVAC system of claim 2, wherein the one of the plurality of sensors is the first sensor, and the other sensors on the plurality of sensors are the second sensor and the third sensor.

4. The HVAC system of claim 3, wherein the controller is configured to actuate the position of the damper to at least approximately 10% open when determining the data from the one of the plurality of sensors based on the data from other sensors of the plurality of sensors.

5. The HVAC system of claim 1, wherein the controller is configured to activate an alarm upon determining that the data from the one of the plurality of sensors is unavailable.

6. The HVAC system of claim 1, wherein the one of the plurality of sensors is the first sensor, and the other sensors of the plurality of sensors are the second sensor and the third sensor.

7. The HVAC system of claim 1, wherein the one of the plurality of sensors is the second sensor, and the other sensors of the plurality of sensors are the first sensor and the third sensor.

8. The HVAC system of claim 7, comprising a damper configured to control air flow through an air economizer having the plurality of sensors, wherein the controller is communicatively coupled to the damper.

9. The HVAC system of claim 8, wherein the controller is configured to actuate a position of the damper to no more than approximately 90% open when determining the data from the second sensor based on the data from the first sensor and the third sensor.

10. The HVAC system of claim 9, wherein the controller is configured to determine the data from the second sensor based on the position of the damper.

11. The HVAC system of claim 1, wherein the plurality of sensors consists essentially of the first sensor, the second sensor, and the third sensor.

12. An air economizer of a heating, ventilation, and air conditioning (HVAC) system, comprising:
- a damper configured to control air flow through the air economizer;
- an outside air temperature sensor adapted to measure an outside air temperature of outside air during functional operation;
- a return air temperature sensor adapted to measure a return air temperature of return air during functional operation;
- a mixed air temperature sensor adapted to measure a mixed air temperature of mixed air during functional operation; and
- a controller communicatively coupled to the damper, the outside air temperature sensor, the return air temperature sensor, and the mixed air temperature sensor, wherein the controller is configured to:
  - determine that a single one of the outside air temperature sensor, the return air temperature sensor, and the mixed air temperature sensor is a functionally unavailable sensor while a remaining two sensors of the outside air temperature sensor, the return air temperature sensor, and the mixed air temperature sensor are functional; and
  - estimate a respective measurement of the functionally unavailable sensor based on a position of the damper and data provided by the remaining two sensors, wherein the data provided by the remaining two sensors comprises at least two of: the outside air temperature of outside air, the return air temperature of return air, and the mixed air temperature of mixed air.

13. The air economizer of claim 12, wherein the functionally unavailable sensor is the return air temperature sensor, and the remaining two sensors are the outside air temperature sensor and the mixed air temperature sensor.

14. The air economizer of claim 13, wherein the controller is configured to actuate the position of the damper to no more than approximately 90% open when determining the respective measurement of the functionally unavailable sensor.

15. The air economizer of claim 12, wherein the functionally unavailable sensor is the outside air temperature sensor, and the remaining two sensors are the return air temperature sensor and the mixed air temperature sensor.

16. The air economizer of claim 15, wherein the controller is configured to actuate the position of the damper to at least approximately 10% open when determining the respective measurement of the functionally unavailable sensor.

17. The air economizer of claim 12, wherein the controller is configured to activate an alarm upon determining that the single one of the outside air temperature sensor, the return air temperature sensor, and the mixed air temperature sensor is the functionally unavailable sensor.

18. An air economizer of a heating, ventilation, and air conditioning (HVAC) system configured to intake outside air from a surrounding environment, mix the outside air with return air from a building to form mixed air, and supply the mixed air to the building, wherein the air economizer comprises:
- a damper configured to control air flow through the air economizer;
- an outside air temperature sensor configured to measure an outside air temperature of the outside air;
- a return air temperature sensor configured to measure a return air temperature of the return air;
- a mixed air temperature sensor configured to measure a mixed air temperature of the mixed air; and
- a controller communicatively coupled to the damper, the outside air temperature sensor, the return air temperature sensor, and the mixed air temperature sensor, wherein the controller is configured to determine that the mixed air temperature sensor is unavailable and estimate the mixed air temperature based on a position of the damper, the return air temperature, and the outside air temperature.

19. The air economizer of claim 18, wherein the controller is configured to activate an alarm upon determining that the mixed air temperature sensor is unavailable.

* * * * *